United States Patent [19]

Watamura

[11] Patent Number: 4,520,701
[45] Date of Patent: Jun. 4, 1985

[54] TOOL HOLDER FOR LATHE

[76] Inventor: Abe S. Watamura, 6626 Gatto St., El Cerrito, Calif. 94530

[21] Appl. No.: 453,781

[22] Filed: Dec. 27, 1982

[51] Int. Cl.³ .............................................. B23B 29/00
[52] U.S. Cl. ......................................... 82/36 R; 82/37
[58] Field of Search ............ 82/37, 36 R, 36 B, 36 A; 407/109, 110; 408/154, 156; 403/381, DIG. 8, 248

[56] References Cited

U.S. PATENT DOCUMENTS

| | | | |
|---|---|---|---|
| 2,527,871 | 10/1950 | Bakewell | 82/36 |
| 3,691,884 | 9/1972 | Lindgren | 82/36 |
| 3,859,699 | 1/1975 | Lindskog | 408/143 |

FOREIGN PATENT DOCUMENTS

| | | | |
|---|---|---|---|
| 1046616 | 12/1953 | France | 82/36 |
| 226270 | 3/1943 | Switzerland | 82/37 |
| 903592 | 2/1982 | U.S.S.R. | 403/381 |

Primary Examiner—Francis S. Husar
Assistant Examiner—William E. Terrell
Attorney, Agent, or Firm—Alvin E. Hendricson

[57] ABSTRACT

A clamping block adapted to be mounted for adjustable translation and rotation upon a lathe has tool holding elements slidably engaging the block by a key and keyway with a slot in the block defining a limitedly pivotable portion operated by a threaded bolt and hardened balls in a block bore for readily locking and unlocking the key in the keyway.

4 Claims, 7 Drawing Figures

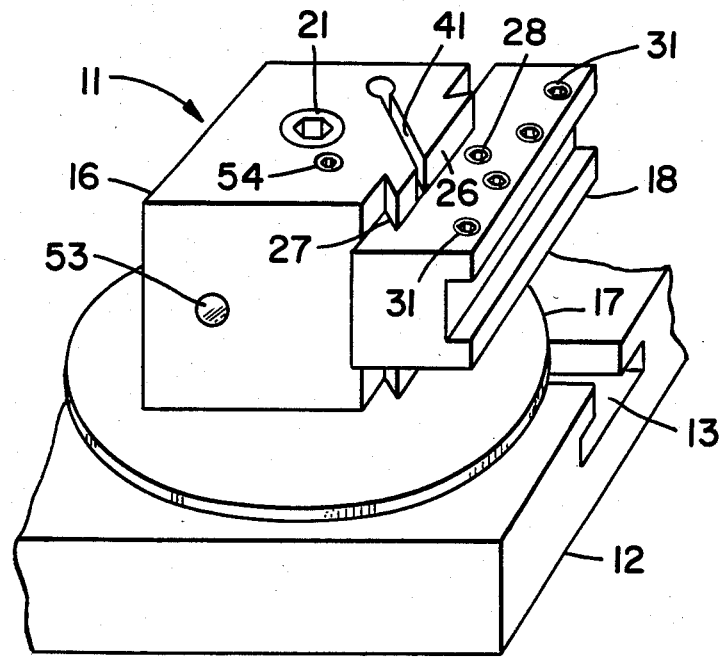
FIG_1
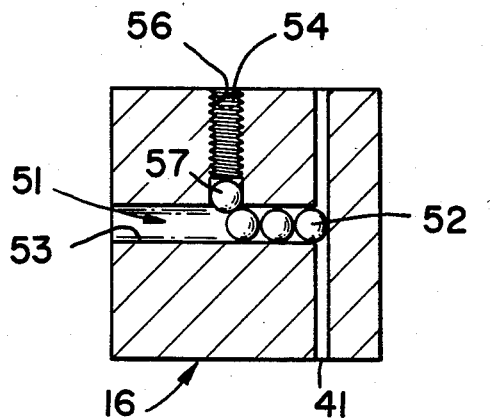
FIG_5
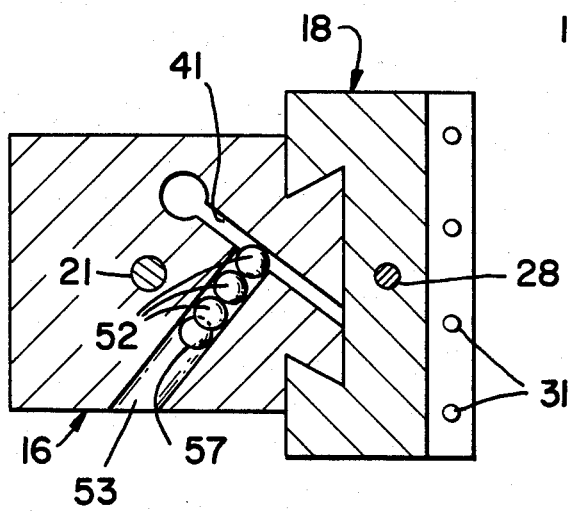
FIG_4

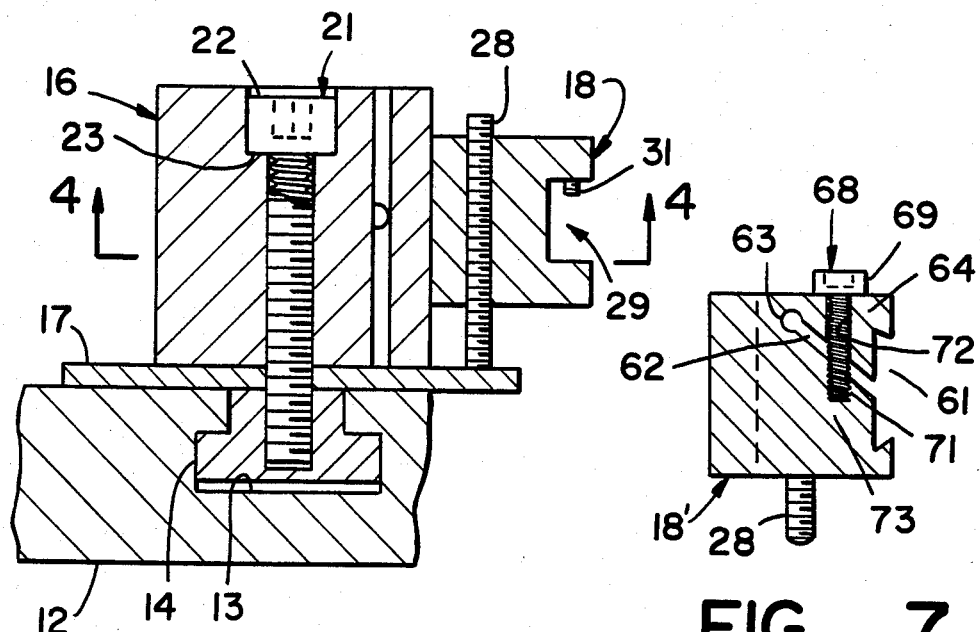
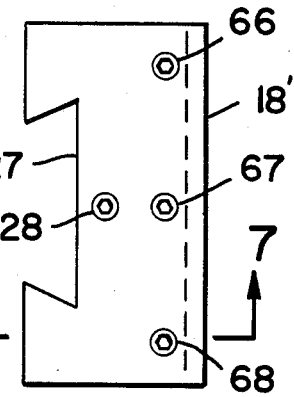
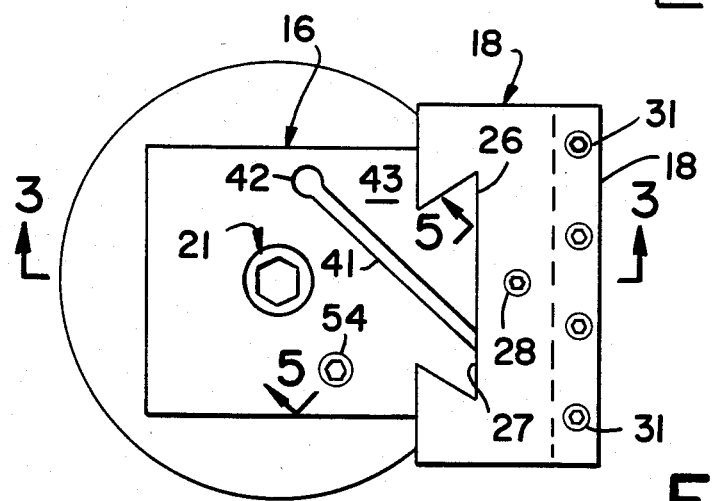

TOOL HOLDER FOR LATHE

BACKGROUND OF INVENTION

Tools are mounted upon lathes in a variety of ways and for a multiplicity of purposes from turning down a rotating workpiece to cutting off and finishing an end of a workpiece. Large commercial lathes employed in industry are normally provided with a heavy rigid tool holder of complex structure which may include a wedge-type mechanism for locking a tool in adjusted position. It is recognized that tool mounting must be quite rigid for precision lathe work and commercial tool mounts provide this necessary rigidity.

On the other hand, available tool mounts for smaller lathes tend to lack the desired rigidity and stability for precision work. The present invention provides a very sturdy and rigid holder of simple structure which positively clamps a tool and, in fact, a variety of different tools for holding same in adjustable positions to perform desired lathe operations.

SUMMARY OF INVENTION

The present invention provides a simple sturdy tool holder particularly adapted for small lathes with an improved positive locking arrangement for fixing a tool in predetermined adjusted position.

The holder of this invention is adapted to be mounted on a lathe compound by sliding a Tee nut of the holder into the slot of the compound and a central bolt threaded into the Tee nut clamps same in desired location along the Tee slot. A bearing disc above the Tee nut carries a mounting block in rotatable position thereon that is fixed by tightening the central bolt.

The mounting or clamping block disposed upon the bearing disc has the central bolt extending therethrough and bearing thereon and includes a vertical key with inclined sides along one side thereof. A holder with a horizontal tool slot in the outer side has a keyway transversely across the other side for slidably engaging the block key.

The clamping block locks the holder in vertically adjusted position by means of a vertical slot in the block extending from the outer surface of the key at an angle into the block so that the key is laterally expandable to grip the keyway in the holder. A plurality of hardened steel balls are disposed in a bore in the block normal to the vertical slot and a tightening bolt is threaded downwardly from the top of the block to bear on a steel ball only slightly extending into the bore. Turning of the tightening bolt forces the balls against the block portion on the opposite side of the vertical slot to deflect the block apart and lock the key in the holder keyway.

The holder hereof may have a variety of different configurations for gripping tools of various configurations but in each case a very firm gripping action is provided. Thus a tool slot of rectangular configuration with a plurality of bolts threaded through the holder to the slot is suitable for securing a tool of rectangular configuration. A narrow cut-off tool, on the other hand, is herein gripped by a holder having an undercut tool slot for receiving the tool in slidable relation and having a slotted configuration with a bolt threaded in the holder to deflect a part of the holder for compressing the tool slot about the tool.

There is herein provided a simple but very sturdy tool holder for rigidly mounting a tool and preventing any inadvertent tool movement that might otherwise result from forces acting on the tool during use.

BRIEF DESCRIPTION OF DRAWINGS

The present invention is illustrated with respect to particular preferred embodiments thereof in the accompanying drawings, wherein:

FIG. 1 is a projected illustration of a preferred embodiment of the present invention mounted upon a lathe;

FIG. 2 is a top plan view of the holder of FIG. 1;

FIG. 3 is a central vertical section taken in the plane 3—3 of FIG. 2;

FIG. 4 is a transverse section taken in the plane 4—4 of FIG. 3;

FIG. 5 is a vertical sectional view through the clamping means of the clamping block and taken in the plane 5—5 of FIG. 2;

FIG. 6 is a top plan view of an alternative holding element for a cut-off tool; and FIG. 7 is a transverse vertical section taken in the plane 7—7 of FIG. 6.

DESCRIPTION OF PREFERRED EMBODIMENTS

The present invention provides a small lathe tool holder which is quite simple in construction and yet which is very sturdy and retains a lathe tool rigidly in adjusted position. A tool holder, in accordance with the present invention, is illustrated in FIG. 1 at 11 as being mounted upon the compound 12 of a lathe. Conventionally, a lathe compound has a flat upper surface with a Tee slot 13 therein which generally comprises an undercut slot, as shown, to receive a Tee nut 14 of a tool holder in the manner illustrated in FIG. 3 and described below.

The tool holder 11 includes a clamping block or mounting block 16 resting upon a flat bearing plate 17 and carrying a tool mount or holder 18 in vertically adjustable position thereon. The clamping block 16 is rotatably mounted on the bearing disc 17 so as to be controllably angularly indexed with respect thereto and the alignment of the holder 11 on the compound 12 is only chosen in FIG. 1 for convenience of illustration.

Referring now particularly to FIGS. 2 through 5 it will be seen that the clamping block 16 preferably has a generally rectangular configuration and is formed of metal so as to comprise a substantially rigid block. The clamping block is disposed atop the bearing disc 17 and Tee nut 14 with a central locking bolt 21 disposed vertically downward through the mounting block and bearing disc into threaded engagement with the Tee nut 14. The bolt 21 has an enlarged head 22 with the underside thereof resting upon the shoulder 23 in a central vertical bore through the mounting block with a hexagonal depression in the upper surface of the bolt head 22. It will be seen that rotation of the bolt 21 as by an Allen wrench inserted in the bolt head depression will draw the Tee nut 14 upwardly to clamp the bearing disc 17 and clamping block 16 together. Additionally, this will cause the Tee nut 14 to be pressed upwardly into locking engagement with the Tee slot 13 in the lathe compound so as to fix the position of the present invention longitudinally of this slot.

The tool mounting element 18 of the present invention is engaged with the clamping block 16 by means of a vertical undercut key 26 along one side of the clamping block mating with an undercut keyway 27 vertically of the back side of the mounting element 18. The mounting element 18 is movable vertically of the clamping block 16 by slidable engagement of the key 26 in the keyway 27 and a bolt 28 is threaded vertically through the mounting element 18 to depend therefrom and bear upon the upper surface of the bearing disc 17. It will be seen that rotation of the bolt 28 as by means of an Allen wrench mating with an hexagonal depression in the top thereof will raise or lower the mounting element as it slides along the key 26. A longitudinal slot 29 in the outer face of the mounting element 18 is adapted to receive a lathe tool and a plurality of bolts 31 are threaded vertically downward from the top of the mounting element into this slot 29 for bearing upon a tool disposed in the slot to firmly lock the tool therein in extension logitudinally from the mounting element 18.

The vertical elongated key 26 of the clamping lock 16 has the edges thereof inclined inwardly from the outer surface of the key as illustrated, for example, in FIGS. 2 and 4. The keyway 27 extending vertically through the back side of the mounting element 18 has the sides thereof inclined upwardly away from each other from the back surface of the mounting element 18. The side angles of the key and keyway are substantially the same so that the mounting element may be slipped onto the clamping block from above to slide vertically up and down the key 26.

Particular provision is made herein for locking the mounting element at the desired height above the bearing plate 17 and for maintaining the mounting element in fixed position with respect to the clamping block 16. This provision herein includes a vertical slot 41 extending through the block 16 from the top to the bottom at an angle of approximately 45° to the outer surface of the key 26. The slot 41 extends inwardly of the block 16 from the outer surface of the key thereof and terminates in a vertical circular bore 42 spaced from the side of the block adjacent the side having the key 26 thereon. This then defines a minor or small portion 43 of the block 16 including a part of the key 26 which is generally separated from the larger remainder of the block and which is capable of being pivotally forced away from the remainder of the block. Such pivotal movement of the block portion 43 will be seen to serve to expand the key 26 laterally within the keyway 27 of the mounting element 18 so as to firmly lock the latter to the clamping block 16. This pivotal movement is herein provided for by clamping means 51 including a plurality of hardened steel balls 52 disposed in a bore 53 normal to the slot 41 adjacent the center of the height of the block 16. These balls 52 fit the diameter of the bore 51 so as to be movable therein without play and provision is made for urging these balls 52 inwardly of the bore 53 by a clamping bolt 54 inserted in a vertical bore 56 in the top of the block 16 for bearing upon a further hardened steel ball 57 in the lower end of the vertical bore 56 intersecting the horizontal bore 53. This upper steel ball 57 rests against the outer ball 52 in the horizontal bore 53 and, in fact, engages the upper outer quarter perimeter of such ball 52 so that threading of the bolt 54 into the block will force the ball 57 engaging the underside of the bolt against the outer ball 52 to force the array of ball 52 toward and, in fact, across the slot 41. This will then apply an outward force to the block portion 43 to pivot same away from the remainder of the block and thus to laterally expand the key 26 in the keyway 27 and consequently lock the key and keyway together.

It is to be appreciated that by the provision of the upper steel ball 57 bearing upon the outermost ball 52 of the array thereof, no problem of wear occurs for the balls 52 and 57 are hardened and any wear on the lower end of the locking bolt 54 is readily accommodated by the threaded engagement thereof in the vertical bore 56. This arrangement then provides for a simple and substantially wear-proof locking arrangement for clamping the key in the keyway to positively establish and maintain the position of the mounting element 18 on the clamping block 16. It is also noted that the circular bore 42 at the inner end of the slot 41 prevents concentration of stresses during slight deflection or pivotal movement of the block portion 43 that might otherwise cause a fracture of the block. Release of the clamping action is readily accomplished merely by backing off the locking bolt 54 so that the array of balls 52 are free to move slightly back from the slot 41 whereby the block portion 43 resumes original position so that the key 26 is slidable in the keyway 27.

The present invention is adapted to mount and rigidly retain in adjusted position a tool holder 18 in the manner described above and it is also noted that the physical configuration of this tool holder may also vary in accordance with the type of tool to be held for lathe operations. In FIGS. 6 and 7 there is illustrated an alternative tool holder or tool mount $18^1$ adapted to retain a cut-off tool which may be comprised as a very thin elongated plate of tool steel having a sharpened outer end. Such a tool is well known in lathe operations and is thus not illustrated herein; however, the holder $18^1$ will be seen to include the keyway 27 of the holder 18, as described above, and cooperating with the key 26 of the clamping block 16 in the above-described manner. There is also provided a height-adjusting bolt 28 threaded through the holder 18 for engaging the bearing plate 17 to adjust the height of the mounting element $18^1$. This mounting element is additionally provided with an undercut longitudinal slot 61 along the outer edge thereof on the opposite side from the keyway 27 and dimensioned to receive a thin elongated cut-off blade or tool therein in sliding engagement from an end thereof. Clamping of this thin tool within this undercut slot 61 is herein accomplished by the provision of a longitudinal inclined slot 62 extending from the front to the back of the holding or mounting element $18^1$ and extending into the undercut slot 61 at an angle of about 45° and terminating internally of the mounting element in a circular bore 63. This then provides in the same manner as the clamping block 16 a portion 64 of the mounting element $18^1$ which is pivotal relative to the remainder of the mounting element. Provision is herein made for controllably pivoting this portion 64 by a plurality of bolts 66, 67 and 68 disposed in longitudinal array along the mounting element $18^1$ and extending therein from the top thereof.

Considering the bolt 68, which is illustrated in FIG. 7, it will be noted that same includes a bolt head 69 and a depending shank 71 which extends downwardly through a bore 72 in the mounting element $18^1$ across the slot 62 and into a threaded portion 73 of the bore 72 below the slot 62. It will thus be seen that this bolt 68 may be turned, for example, by providing an hexagonal indentation in the top thereof for engagement by an Allen wrench for threading the bolt into the threaded portion 73 of the bore 72 so that the head 69 of the bolt will force the portion 64 of the mounting element $18^1$ downwardly to thus compress the keyway or undercut slot 61 along the outer side of the mounting element $18^1$ for firmly gripping the thin blade or cutoff tool disposed therein. This mounting element 18¹ will thus be seen to have certain similarities to the clamping block 16 of the present invention and to be particularly provided for very narrow blades or tools that may be mounted by the present invention for particular applications in lathe operations.

It will be apparent from the foregoing description of the present invention that same is adapted to securely mount lathe tools in adjusted position relative to a compound 12 of the lathe so that the tools so mounted may be employed for intended purposes upon the workpiece rotated by the lathe. Numerous degrees of adjustment are herein provided and yet there results herefrom an extremely rigid tool mounting in adjusted position. This is particularly important for a precision lathe operation wherein any tool movement other than that required or designed will result in imperfections in the workpiece. As previously noted, it is possible to accomplish the objects of the present invention with much more complicated mechanisms; however, the present invention is particularly directed to those applications wherein such complicated mechanisms may not be warranted, either because of cost, size, or complexity.

The present invention has been described above with respect to particular preferred embodiments thereof; however, it will be apparent to those skilled in the art that numerous modifications and variations are possible within the scope of the present invention and thus it is not intended to limit the invention to the precise terms of description or details of illustration.

What is claimed is:

1. A tool holder for a lathe comprising
   a clamping block having means disposed beneath same for engaging a lathe for adjustable attachment thereto and including vertically disposed undercut key extending along a first side of said block,
   a mounting element having a longitudinal tool-receiving depression with means for gripping a tool disposed therein and having an undercut keyway across a side thereof opposite said depression and adapted to slidably engage the vertical undercut key of said clamping block, and
   said clamping block having a slot vertically therethrough in extension through said key at an acute angle to said key to define a minor pivotal portion of said block and locking means in said block for adjustably engaging said pivotal portion of said block through said slot for pivoting said minor block portion to expand said key laterally and lock same in the keyway of said mounting element.

2. The tool holder of claim 1 further defined by the slot in said clamping block being inclined at substantially 45° to the outer surface of said key and terminating internally of said block in a circular bore.

3. A tool holder for a lathe comprising
   a clamping block having means disposed beneath same for engaging a lathe for adjustable attachment thereto and including a vertically disposed undercut key extending along a first side of said block,
   a mounting element having a longitudinal tool-receiving depression with
      means for gripping a toll disposed therein and having an undercut keyway across a side thereof opposite said depression and adapted to slidably engage the vertical undercut key of said clampling block,
   said clamping block having a slot vertically therethrough in extension through said key to define a minor pivotal portion of said block and locking means in said block for adjustably engaging said pivotal portion of said block through said slot for pivoting said block portion to expand said key laterally and lock same in the keyway of said mounting element, and
   said locking means comprising
      an array of contiguous steel balls disposed in a lateral bore in said block extending to one side of said slot in said block,
   a bolt theaded to a vertical bore in said block intersecting said lateral bore and having a further steel ball disposed in said vertical bore for engaging the lower end of said bolt of said bolt and engaging the outer side of the outermost ball of said array of balls above the center thereof for retaining said array in said lateral bore,
   whereby threading of said locking bolt into said block forces an end ball of said arry of balls across said slot to deflect said pivotal block portion for laterally expanding said key,
   forces an end ball of said array of balls across said slot to deflect said pivotal block portion for laterally expanding said key.

4. The tool holder of claim 1 further defined by
   said mounting element having a thin slot extending longitudinally therethrough and at an acute angle therein from said longitudinal tool-receiving depression, and at least one bolt disposed vertically in a vertical bore in said mounting element across said thin slot with a bolt head atop the mounting element and the bolt threadably engaging said vertical bore only on the opposite side of said slot from the bolt head,
   whereby tightening of said bolt compresses said tool receiving slot to clamp a tool therein.

* * * * *